Patented Feb. 26, 1952

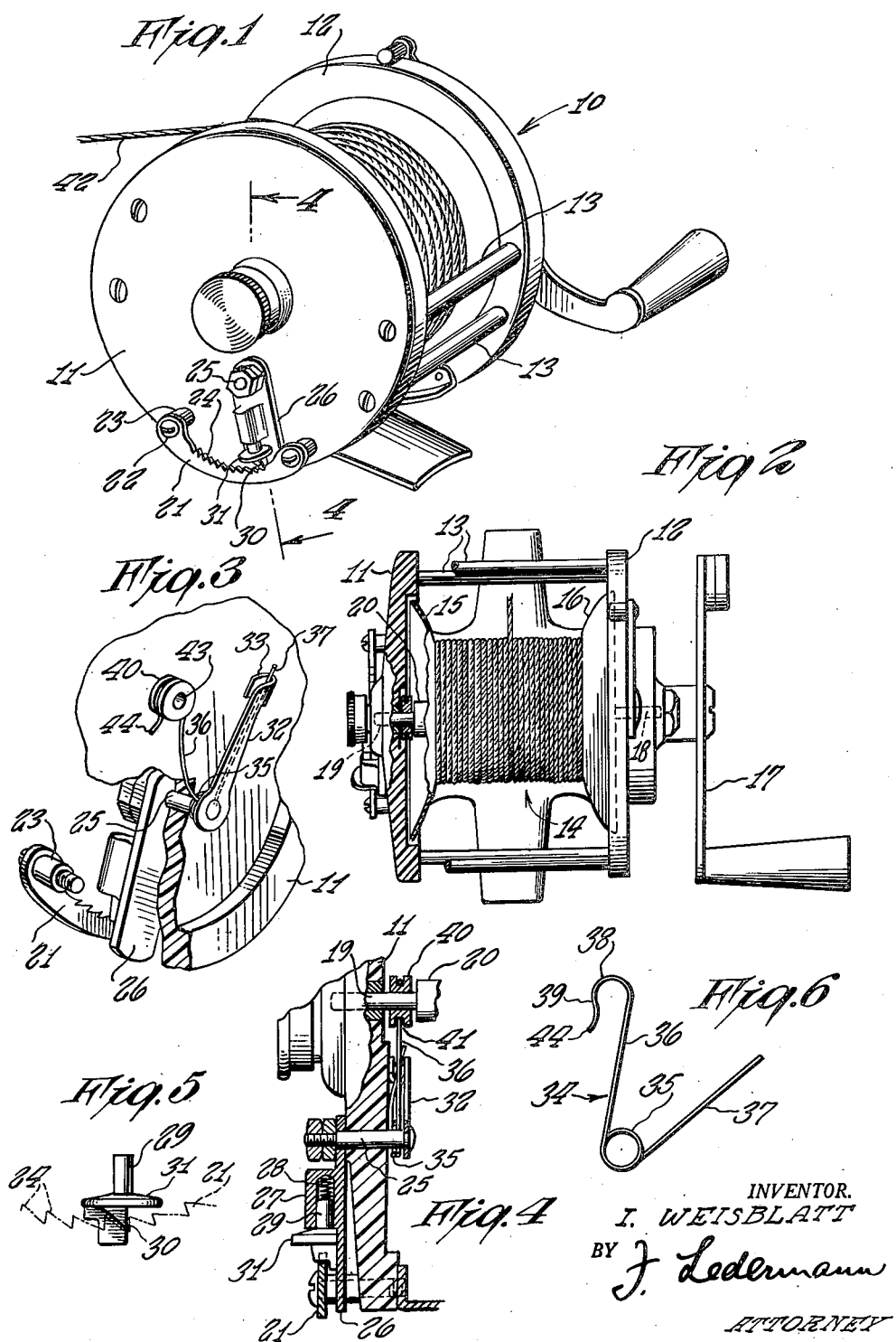

2,587,257

UNITED STATES PATENT OFFICE 2,587,257

FISHING REEL BRAKE

Isaac Weisblatt, New Rochelle, N. Y.

Application December 16, 1950, Serial No. 201,186

3 Claims. (Cl. 242—84.5)

This invention relates to fishing reels, and the main object thereof is the provision of means for applying a variable degree of drag on the line, in the form of a novel arrangement of parts associated with the reel. The provision of the improvements herewith presented enhances the accuracy of casting a bait into a particular area of a body of water, and it also serves to reduce the tendency of the line to snarl when weight casting in the event the weight is severed from the line in the air.

The above broad as well as additional and more specific objects will be clarified in the following description wherein characters of reference refer to like-numbered parts in the accompanying drawing. It is to be understood that it is neither desired nor intended to limit the invention necessarily to any or all of the specific details of construction shown in the drawing except insofar as they may be deemed essential to the invention, since the prime purpose of the drawing is to illustrate the invention.

Referring briefly to the drawing, Fig. 1 is a perspective view of a fishing reel having the invention applied thereto.

Fig. 2 is a top plan view of the reel shown in Fig. 1, with parts broken away and partly in section.

Fig. 3 is an enlarged fragmentary perspective view of the reel looking generally in a direction toward the left of Fig. 4, with parts omitted, with other parts broken away, and partly in section.

Fig. 4 is a sectional view taken on the line 4—4 of Fig. 1.

Fig. 5 is a fragmentary side view looking toward the right of Fig. 4, showing the structure of the spring-projected toothed slide in engagement between the teeth of the toothed sector, the latter shown in broken lines, the position of the said slide with respect to the sector controlling the tension of the braking means on the reel drum.

Fig. 6 is a view of the spring whose force is utilized to produce the desired drag on the reel drum.

Referring in detail to the drawing, the numeral 10 indicates a fishing reel having a frame including the two opposed circular walls or discs 11 and 12 and the connecting bars 13. The winding drum of the reel is shown at 14, the two sheaves of the drum at 15 and 16, and the crank at 17. All of these parts represent standard construction.

The drum 14 is rotatably mounted in the walls 11 and 12 by providing bearings in the latter for reception of the opposed shaft extremities or pins 18 and 19. A boss 20 is provided at the base of the shaft pin 19, against the sheave 15.

A sector 21 is mounted on the outside of the wall 11 by means of screws 22 and is spaced a short distance from and parallel with the wall 11 by means of spacer sleeves 23. Spaced teeth 24 are provided along the concave edge of the sector.

A pin 25 extends through the wall 11 on an axis positioned between the axis of the drum 14 and the sector 21. An arm 26 has one end rigid with the pin 25 and extends radially therefrom outward and under the sector 21. The lower end of this arm carries a socket 27 having a compression spring 28 and a stem 29. The latter is slidable in the socket and is normally urged outward from the socket by the spring 28. The extremity 30 of the pin 29 constitutes a tooth engageable or registrable between any pair of mutually adjacent teeth 24 of the sector. A collar 31 rigid on the stem 29 below the tooth 30 serves as a finger grip for manual depression of the stem 29 inward into its socket 27 to retract the stem from engagement with the sector, that is, to permit swinging of the arm 26 and hence partial rotation of the pin 25 on its axis.

A radial arm 32 has one end rigid on the inner extremity of the pin 25 thus positioning the arm 32 adjacent and substantially parallel with the inner surface of the wall 11. The arm 32 has a doubled under transverse ear on its free extremity thereby forming a U-shaped loop 33 thereon. A spring 34, which may be in the nature of a spring wire as illustrated, or in any other suitable form, is deformed into the shape shown in Fig. 6.

The spring 34 comprises a single length of wire having one or more spiral loops 35 formed approximately intermediate its length, with two tangential arms 36 and 37 extending preferably less than a quadrant apart, from the extremities of the spiral loop 35. The extremity of the arm 36 is further doubled back outward to provide an approximately U-shaped support 38 thereon. It is to be noted that the outer side 39 of the support 38 curves inward toward the arm 36 thereby making the distance between the side 39 and the arm 36 at the entrance to the concave support 38 less than the diameter of the semi-circular part of the said support.

Between the boss 20 and the inner surface of the wall 11, a relatively thick ring 40 is loosely mounted on the shaft pin 19. A circular groove 41 is provided in the ring 40. The ring 40 thus registers releasably within the support 38 with the wire registering in the groove 41; thus the ring 40 is carried by the arm 36.

The loop 35 of the spring 34 surrounds the pin 25 between the inner side of the wall 11 and the base of the arm 32, with the spring arm 37 extending along the underside of the arm 32 and passing out through the transverse loop 33 of the latter. Since the ring 40 permanently positions the spring arm 36, it is apparent that swinging of the arm 32 in one direction will urge the ring more forceably against the shaft pin 25, and swinging the same in the opposite direction will lessen the pressure of the ring on the shaft stem.

It will be noted that as the line 42 unwinds, as when casting, the drum 14, not shown in Fig. 3 but whose shaft pin 19 registers in the axial opening 43 through the ring 40, will rotate clockwise. The effect of the outward pull of the unwinding line will be a force tending to pull the drum and hence both its shaft pins in the same direction, that is, into tighter frictional engagement with the forward arcuate portions of the drum shaft bearings. The tension of the spring 34 is such that when the spring tension control arm 26 is in the position shown in Fig. 1, the spring 34 will be relaxed so that the ring 40 applies no force against the shaft pin 19. When the arm 26 is in any other position with respect to the sector 21 the arm 32 will have been moved counter-clockwise (Fig. 3), as shown in Fig. 3, so that an amount of tension will have been applied to the spring 34. This tension of the spring 34 will be applied to the ring 40 in a direction opposite to the direction of travel of the unwinding line and hence will tend to force the forward inner surface of its bore 43 against the forward surface of the shaft pin 19 thereby not only applying a braking surface and force against the shaft stem 19 but also tending to prevent movement in a forward direction of the said shaft stem. The degree of this braking and resisting force of the ring 40 is obviously controlled by the position of the control arm 26 with respect to the sector 21. Thus, the unwinding of the drum will be frictionally slowed down, and by a suitable provision of tension in the spring 34 the proper amount of slowing down of the unwinding drum may be attained to enable the user to control with a greater degree of accuracy the area into which he desires to cast his bait. The loose seating of the ring 40 in its support 38 permits an amount of rotation of the ring so that its inner surface will tend to wear evenly. Moreover, in case the ring becomes too worn, it may be readily replaced in an obvious manner, since it may be slipped out of its support 38 by bending the out-turned lip or extremity 44 of the side 39 of the support, outward.

Also, when the tension of the spring 24 is set at any but its zero position, the consequent drag on the unwinding line will of course tend to lessen the possibility of snarling the line.

Obviously, modifications in form or structure may be made without departing from the spirit or scope of the invention.

I claim:

1. A fishing reel having a frame including two opposed walls and a winding drum provided with shaft pins mounted in aligned bearings in said walls, said drum being adapted to have a weighted fishing line wound thereon, a ring surrounding one of said shaft pins between said drum and the adjacent wall of said walls, said weighted line while unwinding during casting exerting a pull on said drum in a forward direction thereby urging said shaft pins forward against the forward arcuate surfaces of said bearings, and variable means for urging said ring against said one of said shaft pins in a rearward direction, said means comprising a stem passing through said adjacent wall on an axis eccentric to the axis of the drum, a radial arm positioned between said adjacent wall and said drum having one end rigid with said stem, a substantially V-shaped spring having an eyelet substantially intermediate its length, said spring being positioned between said adjacent wall and said drum, one end of said stem passing through said eyelet, one leg of said spring being secured to said ring, the other leg of said spring being secured to said radial arm, and means for turning said stem on its axis to swing said radial arm toward or away from the axis of said ring, said one leg of said spring being positioned in a plane substantially at right angles to the direction of travel of the unwinding line.

2. A fishing reel having a frame including two opposed walls and a winding drum provided with shaft pins mounted in aligned bearings in said walls, said drum being adapted to have a weighted fishing line wound thereon, a ring surrounding one of said shaft pins between said drum and the adjacent wall of said walls, said weighted line while unwinding during casting exerting a pull on said drum in a forward direction thereby urging said shaft pins forward against the forward arcuate surfaces of said bearings, and variable means for urging said ring against said one of said shaft pins in a rearward direction, said means comprising a stem passing through said adjacent wall on an axis eccentric to the axis of the drum, a radial arm positioned between said adjacent wall and said drum having one end rigid with said stem, a substantially V-shaped spring having a substantially circular eyelet substantially intermediate its length, said spring being positioned between said adjacent wall and said drum, one end of said stem passing through said eyelet, one arm of said spring being secured to said radial arm, said ring having a circumferential groove, the other arm of said spring having the free end thereof arcuately doubled back thereby forming a support at said free end thereof, said support registering in said ring groove.

3. A fishing reel having a frame including two opposed walls and a winding drum provided with shaft pins mounted in aligned bearings in said walls, said drum being adapted to have a weighted fishing line wound thereon, a ring surrounding one of said shaft pins between said drum and the adjacent wall of said walls, said weighted line while unwinding during casting exerting a pull on said drum in a forward direction thereby urging said shaft pins forward against the forward arcuate surfaces of said bearings, and variable means for urging said ring against said one of said shaft pins in a rearward direction, said means comprising a stem passing through said adjacent wall on an axis eccentric to the axis of the drum, a radial arm positioned between said adjacent wall and said drum having one end rigid with said stem, a substantially V-shaped spring having a substantially circular eyelet substantially intermediate its length, said spring being positioned between said adjacent wall and said drum, one end of said stem passing through said eyelet, one arm of said spring being secured to said ring, the other arm of said spring being secured to said radial arm, means for turning said stem on its axis to swing said radial arm toward or away from the axis of said ring, said one arm of said ring being positioned in a plane substantially at right angles to the direction of travel of the unwinding line, said last-named means comprising a second radial arm adjacent the outer surface of said adjacent wall having one end secured to the other end of said stem, a sector secured to said outer surface and concentric with said stem, said second radial arm extending toward said sector, said sector having spaced teeth thereon, said second radial arm having a spring actuated bolt engageable between mutually adjacent teeth of said sector.

ISAAC WEISBLATT.

REFERENCES CITED

The following references are of record in the file of this patent:

UNITED STATES PATENTS

| Number | Name | Date |
|---|---|---|
| 1,690,401 | Case | Nov. 6, 1928 |
| 2,544,962 | Legg | Mar. 13, 1951 |

FOREIGN PATENTS

| Number | Country | Date |
|---|---|---|
| 2,206 | Great Britain | Jan. 31, 1910 |
| 249,956 | Great Britain | Apr. 8, 1926 |